(12) United States Patent
Cho et al.

(10) Patent No.: US 7,635,839 B2
(45) Date of Patent: Dec. 22, 2009

(54) METHOD FOR FABRICATING NEUTRON SUPERMIRROR USING NEUTRON MONOCHROMATOR STRUCTURES

(75) Inventors: Sang-Jin Cho, Daejeon-si (KR); Chang-Hee Lee, Daejeon-si (KR); Hark-Rho Kim, Daejeon-si (KR); Ji-Yong So, Daejeon-si (KR)

(73) Assignee: Korea Atomic Energy Research Institute, Daejeon-si (KR)

( * ) Notice: Subject to any disclaimer, the term of this patent is extended or adjusted under 35 U.S.C. 154(b) by 196 days.

(21) Appl. No.: 11/695,073

(22) Filed: Apr. 2, 2007

(65) Prior Publication Data
US 2008/0115338 A1 May 22, 2008

(30) Foreign Application Priority Data
Nov. 17, 2006 (KR) ............... 10-2006-0113808

(51) Int. Cl.
*B21D 33/00* (2006.01)
*G21C 7/00* (2006.01)

(52) U.S. Cl. .......... 250/269.4; 250/505.1; 29/17.4; 376/458; 376/904; 376/906; 359/850; 359/856

(58) Field of Classification Search ........ 250/269.4, 250/269.5, 269.6, 505.1, 518.1; 29/17.1, 29/17.2, 17.3, 17.4; 359/850, 856, 857, 858; 376/458, 459, 904, 906
See application file for complete search history.

(56) References Cited

U.S. PATENT DOCUMENTS

| | | | |
|---|---|---|---|
| 5,082,621 A * | 1/1992 | Wood | 376/458 |
| 5,167,912 A * | 12/1992 | Wood | 376/458 |
| 6,415,086 B1 * | 7/2002 | Hirsch | 385/116 |
| 6,521,101 B1 * | 2/2003 | Skulina et al. | 204/192.27 |
| 6,863,409 B2 * | 3/2005 | Cho et al. | 359/853 |
| 6,977,954 B2 * | 12/2005 | Taylor et al. | 372/50.21 |
| 7,030,397 B2 * | 4/2006 | Mezei et al. | 250/505.1 |
| 2004/0136102 A1 * | 7/2004 | Cho et al. | 359/857 |
| 2005/0220251 A1 * | 10/2005 | Yokoyama et al. | 376/220 |

(Continued)

OTHER PUBLICATIONS

NPL01: Rafaja et al. (J. Phys. Condens. Matter 14 (2002) 5304-5314) "X-ray reflectivity of multilayers with non-continuous interface".*

(Continued)

*Primary Examiner*—Bernard E Souw
(74) *Attorney, Agent, or Firm*—Bachman & LaPointe, P.C.

(57) ABSTRACT

A method for fabricating a supermirror for forming a neutron guide. In the method, a neutron supermirror, which is widely used in the formation of thin films in cold neutron guides and the spectrometer field, is fabricated with nickel thin films and titanium thin films, having varying thickness, using a combination of monochromator structures in which nickel thin films and titanium thin films, having the same thickness, are stacked in the form of periodic structures. According to the method, a combination of monochromator structures having a variety of different thicknesses is formed, such that the amount of the overlap of peaks due to the monochromator structures can be adjusted to increase reflectivity, and some of the monochromator structures can be removed during the fabrication of the supermirror to make it easy to extract monochromatic beams, such that it is easy to fabricate a transmission monochromator, rather than a reflection monochromator.

4 Claims, 12 Drawing Sheets

U.S. PATENT DOCUMENTS

2007/0076837 A1* 4/2007 Cho et al. .................. 376/333
2008/0115338 A1* 5/2008 Cho et al. .................... 29/17.2

OTHER PUBLICATIONS

NPL02: An et al. (Thin Solid Films 496 (2006) 571-575 "Structures of Co90Fe10/Cu multilayers determined by X-ray anomalous scattering measurements" .*

Dhez et al., "Physics, Fabrication, and Applications of Multilayered Structures", NATO ASI Series, pp. 311-313, Plenum Publishing Corporation, New York, US.

N.K. Plsehanov, "Algorithm for the real-structure design of neutron supermirrors", Nuclear Instruments and Methods in Physics Research A 524, (2004), pp. 273-286, Russia.

Hayter et al., "Discrete Thin-Film Multilayer Design for x-ray and Neutron Supermirrors", Solid State Division, Oak Ridge National Laboratory, pp. 35-41, (1989), TN, US.

Schelten et al., "Calculated Reflectives of Super-Mirrors", Nuclear Instruments and Methods, pp. 287-294, (1979), Germany.

Sears, "Theory of Multilayer Neutron Monochromators", pp. 601-608, Atomic Energy of Canada Limited, (1983) Ontario, Canada.

Saxena et al., "Mutlilayer Neutron Monochromators", A33, pp. 805-813, Biology Department (1977), New York, US.

* cited by examiner

Rs : 0.99, Δd : 0, T : 1, Wavelength 0.475nm,
Periodic number= 30, Supermirror of Rs=0.99,~~~,m=2.
Roughness 1.8nm on Ni, 1.5nm on Ti Rs : 0.999, Δd : 1.5, T : 0.7, Wavelength 0.475nm,
Periodic number= 61, Supermirror of Rs=0.99,~~~,m=2.
Roughness 1.8nm on Ni, 1.5nm on Ti Rs : 0.999, Δd : 1.5, T : 0.7, Wavelength 0.475nm,
Periodic number= 61, Supermirror of Rs=0.99,~~~,m=3.
Roughness 1.8nm on Ni, 1.5nm on Ti Rs : 0.999, Δd : 1.5, T : 0.7, Wavelength 0.475nm,
Periodic number= 61, Monochromatic beam filter
comprising supermirror of Rs=0.99,~~~,m=3.
Roughness 1.8nm on Ni, 1.5nm on Ti

METHOD FOR FABRICATING NEUTRON SUPERMIRROR USING NEUTRON MONOCHROMATOR STRUCTURES

BACKGROUND OF THE INVENTION

1. Field of the Invention

The present invention relates to a method for fabricating a supermirror for use in neutron guides and neutron mirrors, and more particularly, to a method for fabricating a neutron supermirror, which is widely used in the fabrication of thin films in cold neutron guides and the spectrometer field. In the inventive method, the neutron supermirror is fabricated with nickel thin films and titanium thin films having varying thickness, using a combination of monochromator structures in each of which nickel thin films and titanium thin films, having the same thickness, are alternately stacked on each other. In other words, the supermirror is fabricated with a combination of monochromator structures having a variety of different thicknesses, which show the overlap of diffraction peaks.

2. Description of the Prior Art

Generally, neutrons have positive (+) scattering-length density in most elements, except for some elements such as gadolinium (Gd) and manganese (Mn).

This means that, unlike electromagnetic waves in the visible light spectrum, the incident angle between the neutrons and the plane of the material is large, and neutrons and X-rays can be totally reflected when they are incident on the surface of material at angles smaller than a critical angle.

The refractive index of most materials on which neutrons are incident is n<1, which means that neutrons are totally reflected when they are incident at angles smaller than a critical angle. Those that reflect incident neutrons using this property are called neutron mirrors, and tubes made by accurately joining these neutron mirrors with an error of less than 10 μm are called neutron guides.

Recently, prior nickel neutron guide tubes having a single-layer thin-film structure have been substituted with supermirrors having a multilayer thin-film structure, which can increase neutron yield 2-4 times or more.

The refractive index of neutrons incident on materials can be expressed by the following equation:

$$n = 1 - \frac{\lambda^2}{2\pi} N_{at}(b_c \pm p)$$

wherein $\lambda$ represents wavelength, $b_c$ represents scattering length, $N_a$ represents atomic density, and P is g×s, where s represents magnetic moment/atom, and g represents $0.27 \times 10^{-12}$ cm/Bohr.

According to the above equation, neutrons incident at angles smaller than the critical angle will be totally reflected.

As shown in FIGS. 1 and 2, a neutron guide 100 is a tube on which nickel or a supermirror is deposited in order to transport cold neutrons from a cold neutron source to an experimental station located a specific distance therefrom in a vacuum without loss.

The neutron guide 100 has a total length of about 40-100 m and is formed by linking a plurality of guide units 110 with each other in series to the desired length.

In each of the guide units 110 constituting the neutron guide 100, pluralities of supermirror substrates 112, each having a length of about 1 m and a very high refractive index, are assembled with each other in a box shape having a rectangular cross section.

Thus, each of such guide units 110 consists of a structure in which neutrons are totally reflected in the guide units at angles smaller than the critical angles due to the supermirror substrates 112 deposited in a thin film.

Meanwhile, it is preferable that the guide units 110 be precisely linked to the guide units 110 on the front and rear sides thereof, such that the size error and alignment error of the front and rear inlets/outlets thereof are maintained at less than 10 μm in order to minimize the loss of neutrons, which can occur during the transport of the neutrons.

In order to transport neutrons to an experimental station without loss, the neutron guide, to which the supermirror for increasing the yield of neutrons is applied, is fabricated by alternately depositing nickel (Ni) and titanium (Ti), so that the total reflection angle (critical angle) thereof can be increased to at least two times that of a neutron mirror fabricated by coating nickel, which reflects neutrons.

This periodical structure of crystal planes diffracts neutrons, electrons, x-rays and the like, and is also used to extract one wavelength.

Such supermirrors include Ni/Ti non-magnetic supermirrors, fabricated by alternating a nickel layer with a titanium layer instead of using a prior Ni single film, and polarizing supermirrors, fabricated using a FeCo/Si, FeCoV/TiZr, Co/Cu or FeCo/Ge film for producing polarized neutrons.

FIG. 3 schematically shows the principle of a monochromator in general use, FIG. 4 schematically shows a TEM photograph of a supermirror in general use, and FIG. 5 is a graphic diagram schematically showing reflectivity as a function of incident angle in a monochromator and supermirror in general, and shows the principle of a Ni/Ti monochromator and a Ni/Ti supermirror, which are in general use.

As shown in the figures, neutrons incident on an interface will be totally reflected when the incident angle ($\theta_i$) is smaller than the critical angle, and will be transmitted when the incident angle ($\theta_i$) is larger than the critical angle.

Specifically, unlike visible rays, neutrons (except for some materials, for example, Ti, Mn, Gd, H, V, and Li) or X-rays have a refractive index less than 1, and thus incident neutrons or x-rays will be totally reflected when the incident angle thereof is smaller than the critical angle.

As used herein, the term "reflectivity" refers to the ratio of the absolute intensity of reflected light to that of incident light, which has a value ranging from a maximum of 1 (total reflection) to zero (0).

Herein, the thin film formed by alternately depositing two different materials to a given thickness will produce a diffracted beam, which is called "Bragg Peak". The monochromator uses the wavelength where this Bragg Peak occurs.

Also, this principle of the monochromator can be used to fabricate a supermirror.

FIGS. 6 and 7 schematically show the principle of polarizing supermirrors in general use.

As shown in the figures, when two different thin films having greatly different scattering length densities are alternately deposited while the thickness thereof is changed, the angle at which the Bragg Peak occurs will change depending on the thickness of the thin films, and the Bragg Peak can continuously occur as a result of adjusting the interval of the change in the thin film thickness. Thus, this principle can be used to fabricate supermirrors.

As shown in FIG. 6, which shows the scattering length densities of materials, a polarizing neutron supermirror is made using materials having different scattering length densities (SLD) of neutrons aligned in the spin-up and spin-down directions under the magnetic field.

For example, when the content ratio of iron (Fe) to cobalt (Co) is set to 89:11, the scattering length density of spin-down neutrons in the iron-cobalt (FeCo) alloy will be the same as the scattering length density of silicon (Si). Thus, when a film of the iron-cobalt (FeCo) alloy and a film of silicon (Si) overlap each other, the spin-down neutrons will be transmitted through both the iron-cobalt (FeCo) alloy film and the silicon (Si) film without distinction, but the spin-up neutrons will be reflected due to the Bragg diffraction phenomenon, as shown in FIG. 7, which shows the path of polarized neutrons.

On the contrary, cobalt (Co) and copper (Cu) have scattering length densities as shown in FIG. 6, and thus the spin-up neutrons will be transmitted through a film of cobalt (Co) and a film of copper (Cu) without distinction, but the spin-down neutrons will be reflected at the interface between cobalt (Co) and copper (Cu).

As described above, the polarizing neutron supermirror can be fabricated by either overlapping the iron-cobalt (FeCo) alloy film with the silicon (Si) film or overlapping the cobalt (Co) film with the copper (Cu) film, and this principle can also be applied either to films of an iron-cobalt-vanadium (FeCoV) alloy film and a titanium-zirconium (TiZr) alloy or to films of iron-cobalt (FeCo) and geranium (Ge) in the same manner.

Various materials can be used to fabricate supermirrors, but generally, a material having a high refractive index and a material having a low refractive index are selectively used. These days, nickel (Ni) and titanium (Ti), which have different refractive indexes, are most widely used.

Herein, assuming that the thickness of one period of nickel (Ni) and titanium (Ti) is d(i), the thickness of a supermirror is calculated according to the following equation:

$$d(i) = \frac{d_c}{\sqrt[4]{i}}$$

wherein $d_c$: critical thickness=$\sqrt{\pi/\rho(\bar{b} \pm p)}/2$ and $\bar{b}$: scattering length density, wherein $p = g\bar{s}$, wherein g: $0.270 \times 10^{-12}$ cm/Bohr magneton and $\bar{s} = M/\rho$: average magneticmoment per atoms.

Supermirrors have been fabricated according to the above-described equation, but they had low reflectivity, and for this reason, modified equations have been proposed. Such modified equations have problems in that, because the thickness of thin films for forming supermirrors gradually changes, it is required to precisely control the thickness of the thin films when applying the thin films, and it is difficult to perform an operation of coating an additional thin film on a specific region to increase reflectivity according to the high incident angle.

SUMMARY OF THE INVENTION

The present invention has been made in order to solve the above-described problems occurring in the prior art, and it is an object of the present invention to provide a method for fabricating a neutron supermirror, which is widely used in the formation of thin films in cold neutron guides and the spectrometer field, the supermirror being fabricated with nickel thin films and titanium thin films, having varying thickness, using a combination of monochromator structures, in each of which nickel thin films and titanium thin films, having the same thickness, are stacked in the form of periodic structures. Specifically, the object of the present invention is to provide a method for fabricating a neutron supermirror using neutron monochromator structures, in which a combination of monochromator structures having a variety of different thicknesses is formed, such that the amount of the overlap of peaks by the monochromator structures can be adjusted to increase reflectivity, and some of the monochromator structures can be removed during the fabrication of the supermirror to make it easy to extract monochromatic beams.

To achieve the above object, the present invention provides a method for fabricating a supermirror for forming a neutron guide having neutrons therein, the method comprising: forming a plurality of double film structures of nickel thin films and titanium thin films, having varying thickness, in such a manner that a predetermined number of nickel thin films and titanium thin films, having the same thickness, are alternately stacked to form monochromators in each of which the nickel thin films and the titanium thin films, having the same thickness, are stacked in the form of periodic structures; and stacking the monochromators, having different thicknesses, on each other.

Preferably, the number of nickel thin films and titanium thin films stacked in the form of the periodic structures is adjusted so as to control reflectivity.

Also, the reflectivity of the monochromators consisting of the periodic structures of nickel thin films and titanium thin films, having the same thickness, is calculated according to a periodic number-calculating equation and an equation for calculating full width at half maximum (FWHM), and the positions of peaks are determined by the calculated periodic number and FWHM.

Herein, the periodic number-calculating equation is as follows:

$$R_{m(max)} = (2Nd^2|F_m|/m)^2$$

wherein $R_{m(max)}$: the maximum reflectivity of the monochromator, N: the periodic number of the thin films, m: order, and structure factor $F_m$ is as follows:

$$|F_m|^2 = \left[(f_a - f_b)\frac{\sin(ms\pi)}{m\pi}\right]^2$$

wherein $f_a$: $b_A \rho_A$, $f_b$: $b_B \rho_B$, and s: the fractional thickness of layer A;

if two thin films have the same thickness and m is an odd number, $F_m$ is as follows:

$$|F_m| = [(f_a - f_b)/m\pi]^2; m = \pm 1, \pm 3 \ldots;$$

if interface diffusion is considered, $F_m$ is defined as follows:

$$|F_m|^2 = \begin{cases} |(f_A + f_B)/2|^2, & m = 0 \\ |(f_A - f_B)/4|^2, & m = \pm 1, \\ 0, & m = \pm 2, \pm 3, \ldots \end{cases} ;$$

if only the reflection of a first peak is considered, $F_m$ is as follows:

$$R_{m(max)} = 4N_i^2 d^4 |F_m|^2;$$

and if refractivity (R) is substituted with reflectivity saturation ($R_s$), the following results:

$$1 - R_s = \exp(-R_m)$$
$$\ln(1 - R_s) = -R_m$$
$$\ln(1 - R_s) = -4N_i^2 d^4 |F_m|^2$$
$$N_i^2 = \frac{-\ln(1 - R_s)}{4d^2 |F_m|^2}.$$

Meanwhile, reflectivity saturation ($R_s$) can be variably applied.

Also, the equation for calculating full width at half maximum (FWHM) is expressed as follows, if absorption ($\beta$) at the position ($\theta_i$) of the $1^{st}$ order Bragg Peak of any monochromator is disregarded:

$$\theta_i \approx \sqrt{\left(\frac{\lambda}{2d_i}\right)^2 + 2\delta}$$

wherein the FWHM of the $1^{st}$ order Bragg Peak is expressed as follows:

$$\Delta\lambda \approx \lambda/N_i$$

and $$\frac{\Delta\lambda}{\lambda} = \cot\theta_i \cdot \Delta\theta_i + \frac{\Delta d}{d_i},$$

wherein $\theta$: incident angle, $\Delta d$: thickness error, and $\Delta\theta_i$ is as follows:

$$\left(\frac{1}{N_i} - \frac{\Delta d}{d_i}\right) / \cot\theta_i = \Delta\theta_i$$

and the position of a Bragg Peak located just next to $\Delta\theta_i$ is expressed as follows:

$$\theta_{i-1} = \theta_i - 2 \cdot \Delta\theta$$

and $$d_{i-1} \approx \frac{\lambda}{2\sqrt{\sin^2\theta_{i-1} - 2\delta}}.$$

Herein, the thickness error ($\Delta d$) can be variably applied.

In addition, the overlap amount $\Delta\theta \times T$ (T: max 1–0) between the Bragg Peaks can be variably applied.

Among the plurality of monochromators having the periodic structures of nickel thin films and titanium thin films, a monochromator reflecting a specific wavelength is removed to extract the specific wavelength.

In another embodiment, the present invention provides a method of fabricating a supermirror for forming a neutron guide having neutrons therein, the method comprising stacking double films of nickel thin films and titanium thin films on each other in the form of periodic structures in each of which a predetermined number of double films having the same thickness are stacked on each other.

In this case, the number of nickel thin films and titanium thin films stacked in the form of periodic structures is adjusted so as to control reflectivity.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Hereinafter, embodiments of the present invention will be described with reference to the accompanying illustrative drawings.

Figure 1:
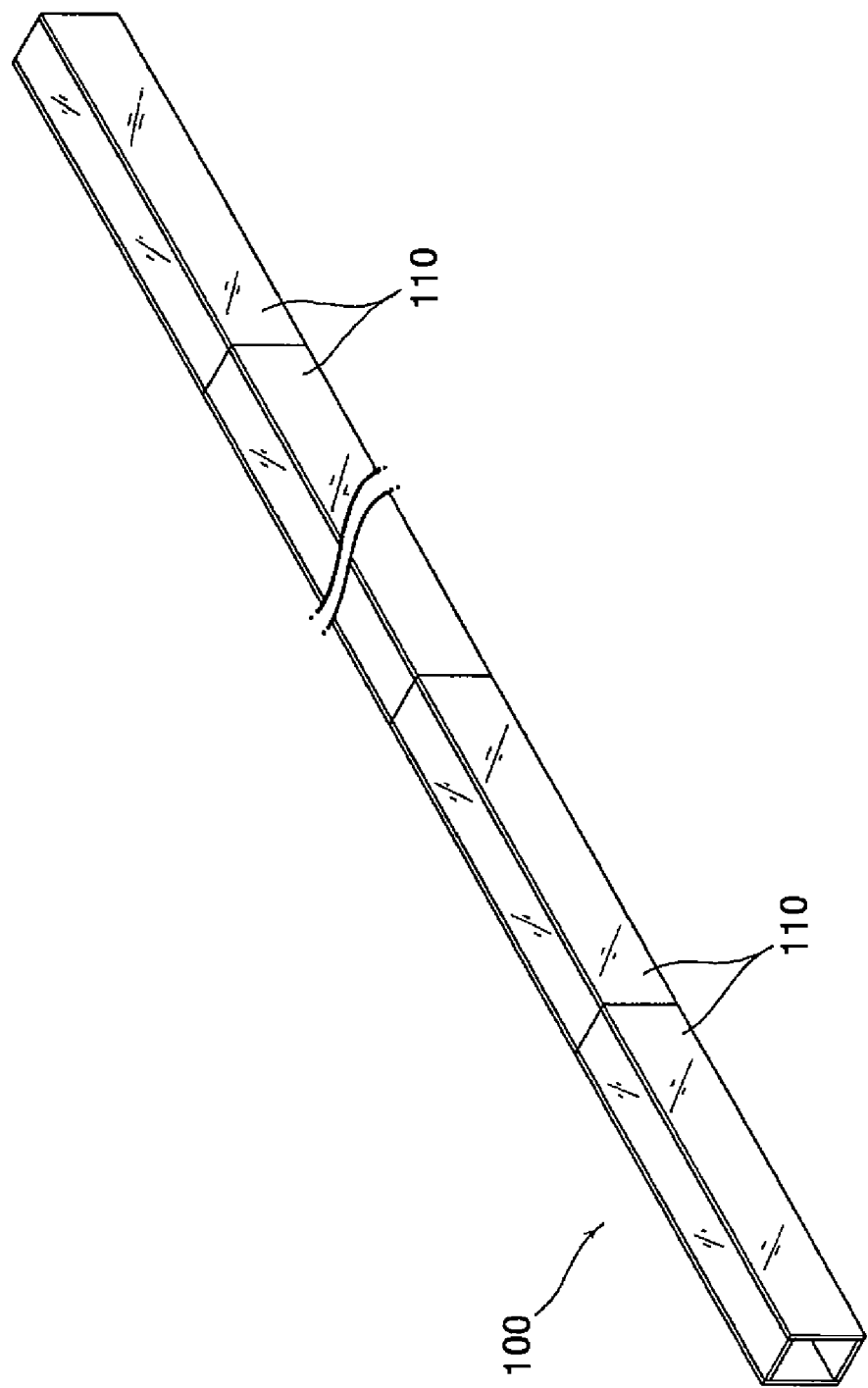
FIG. 1 is a perspective view schematically showing the outer structure of a neutron guide in general use.
Figure 2:
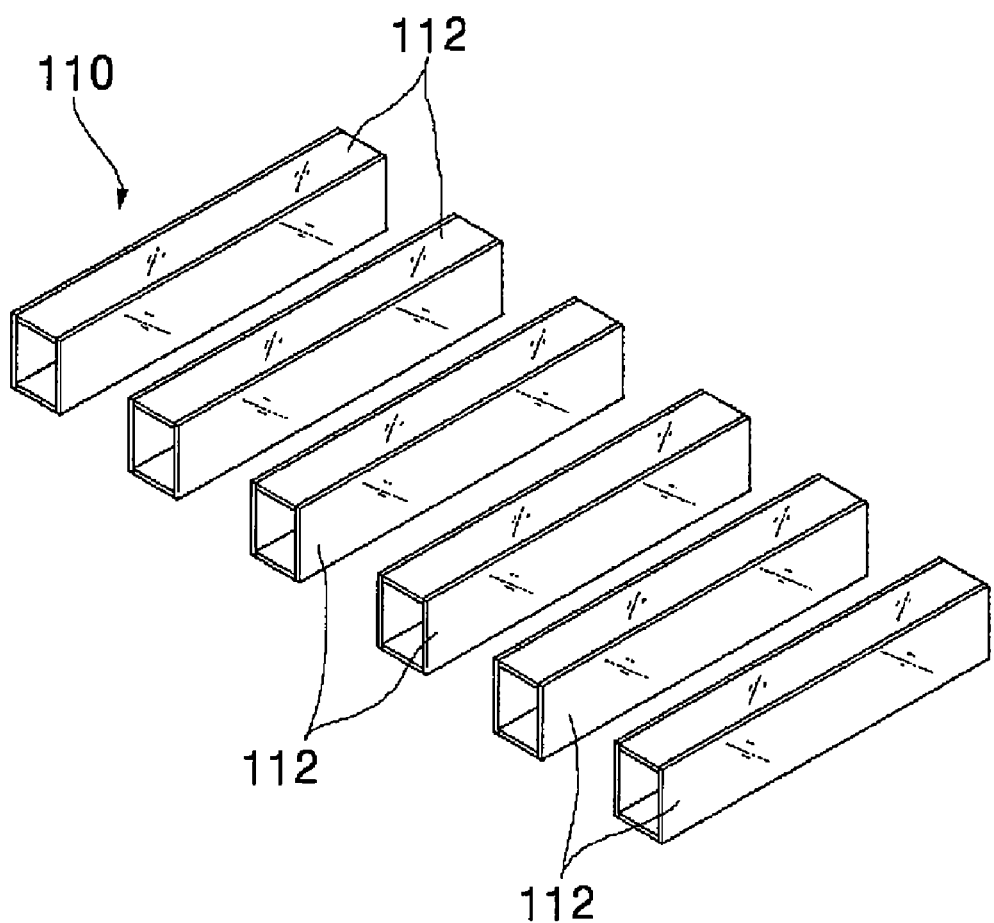
FIG. 2 is a perspective view schematically showing each of the units of a neutron guide in general use.
Figure 3:
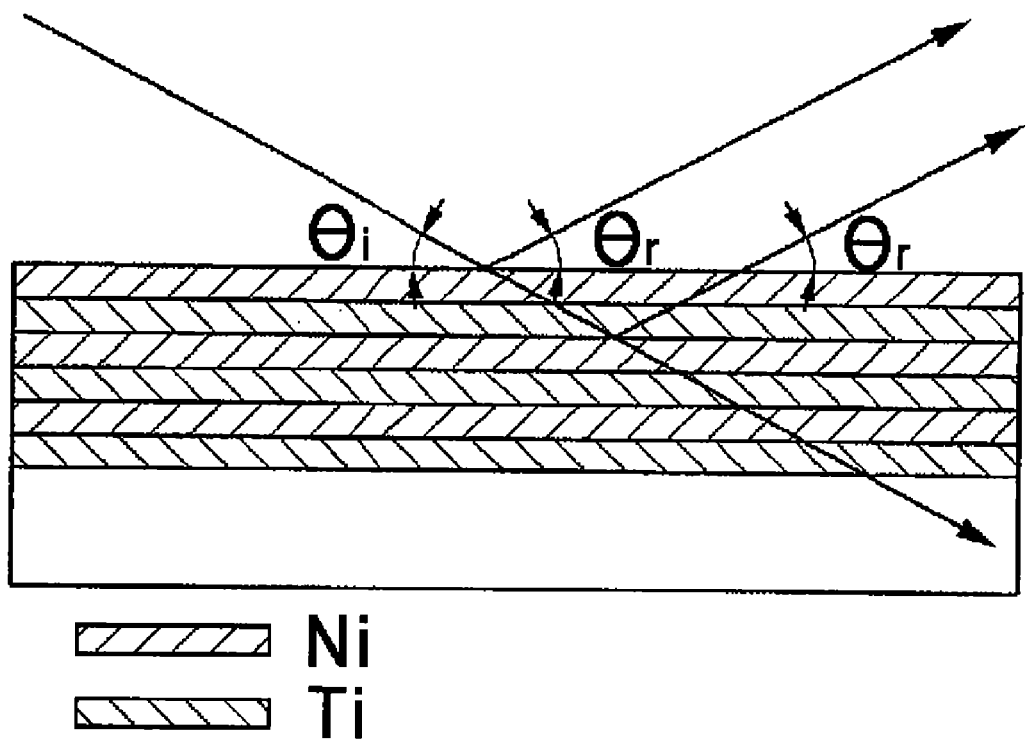
FIG. 3 schematically shows the principle of a monochromator in general use.
Figure 4:
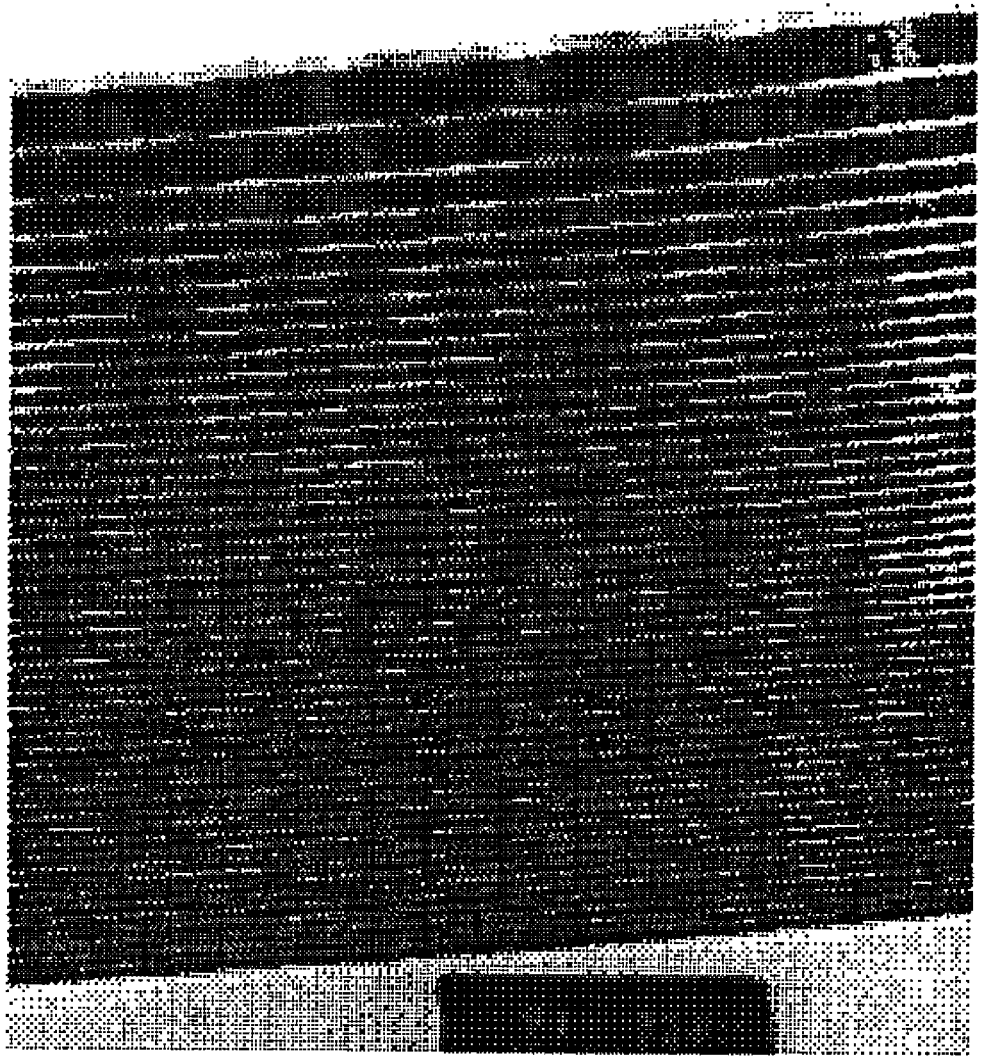
FIG. 4 schematically shows a TEM photograph of a supermirror in general use.
Figure 5:
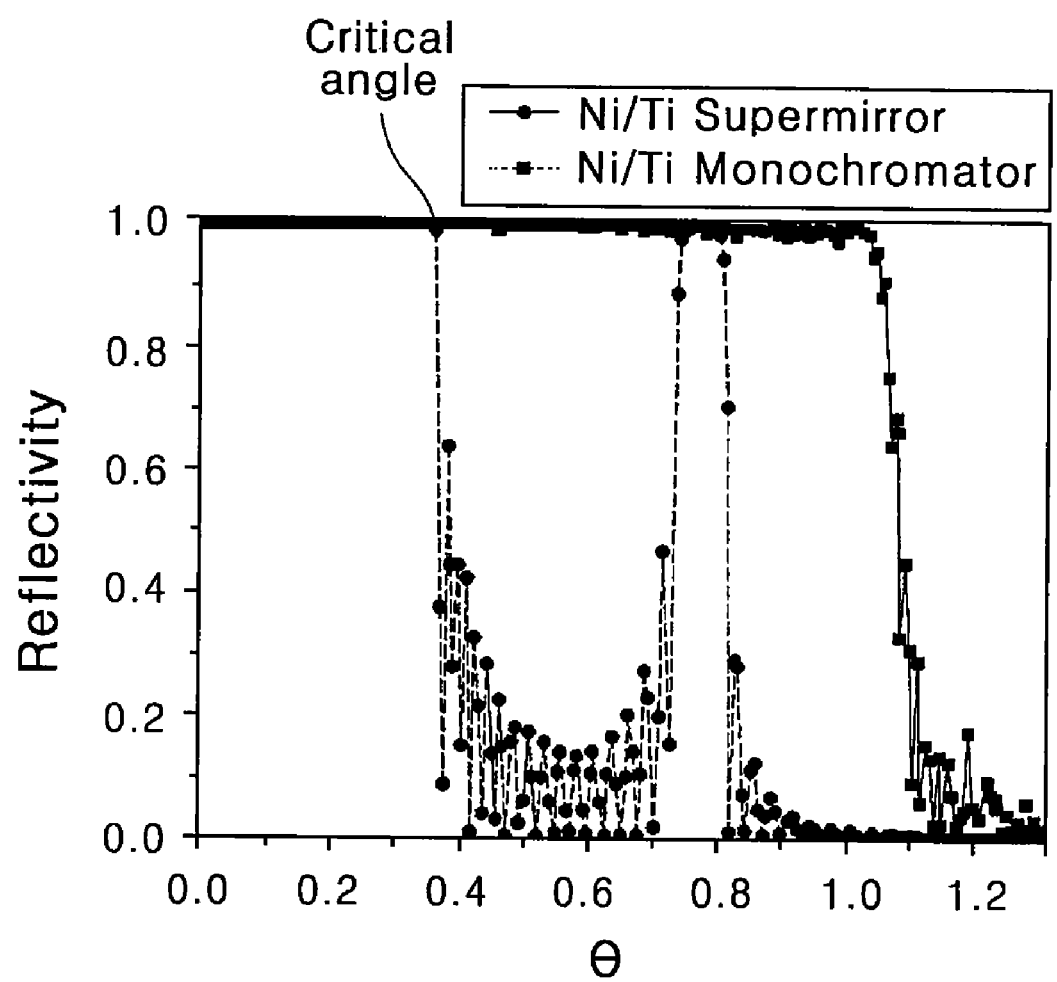
FIG. 5 is a graphic diagram schematically showing reflectivity according to incident angle in a monochromator and a supermirror in general use.
Figure 6:
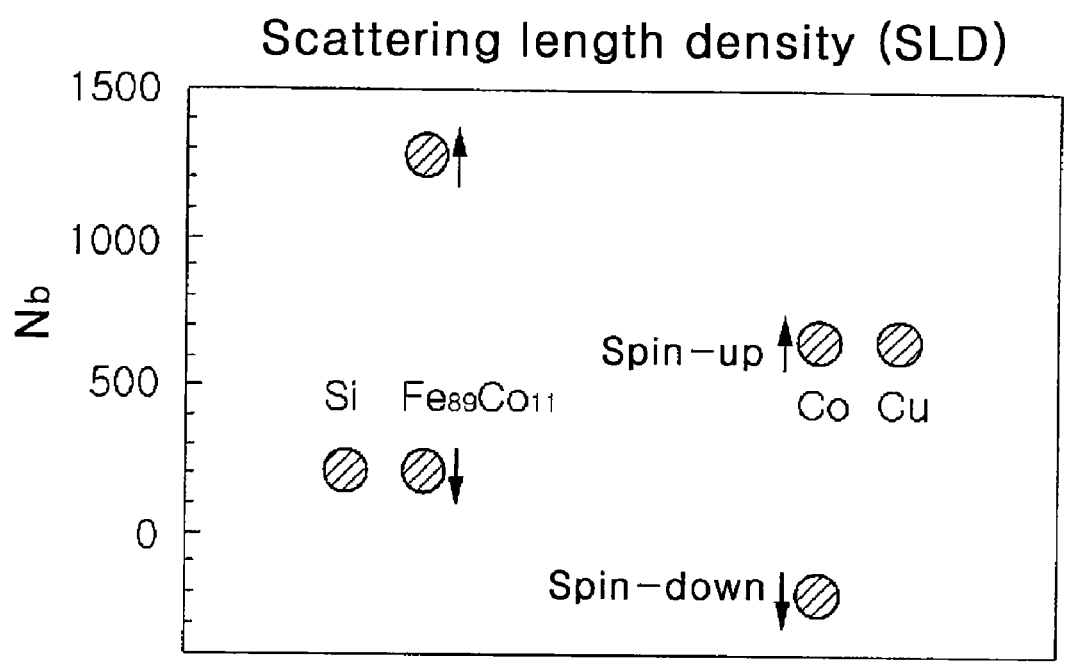
FIGS. 6 and 7 schematically show the principle of a polarizing supermirror in general use.
Figure 7:
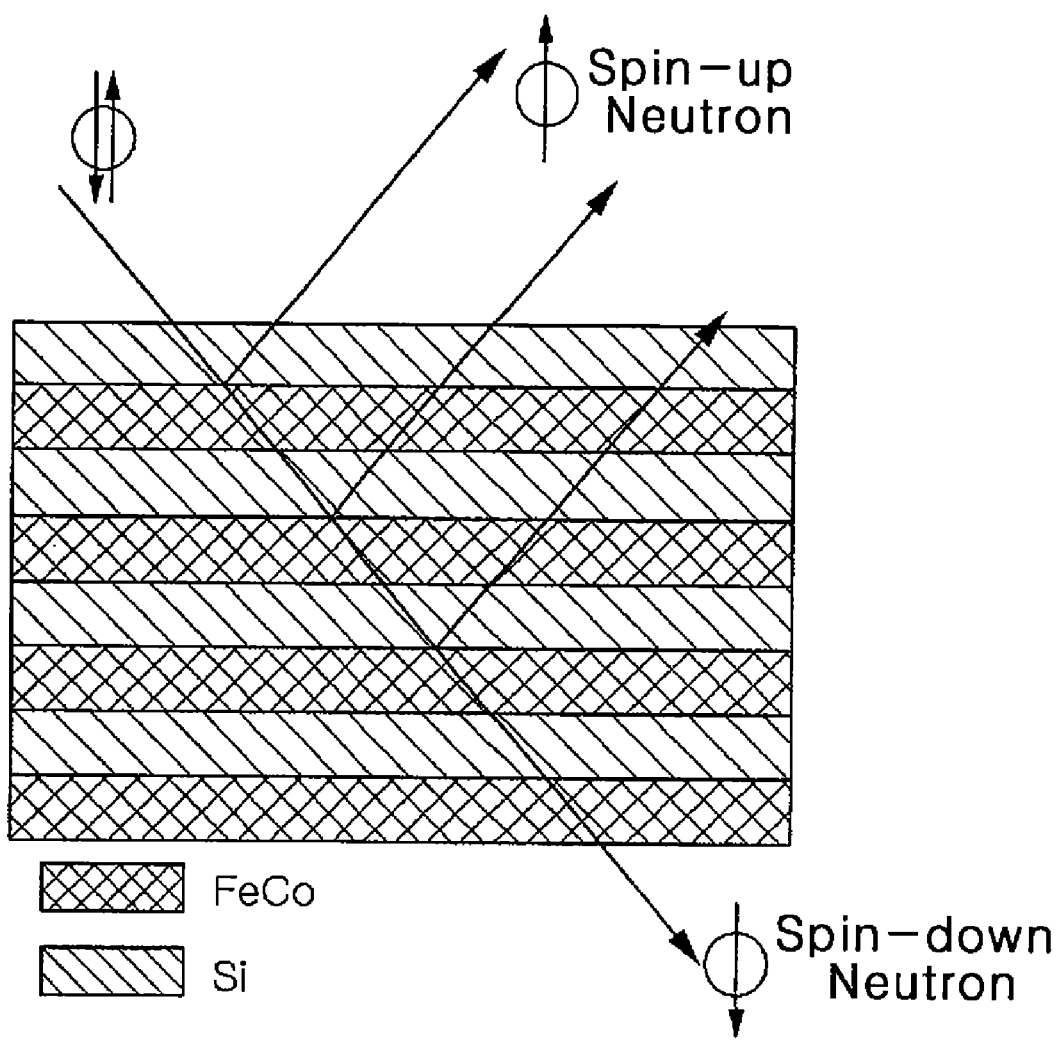
Figure 8:
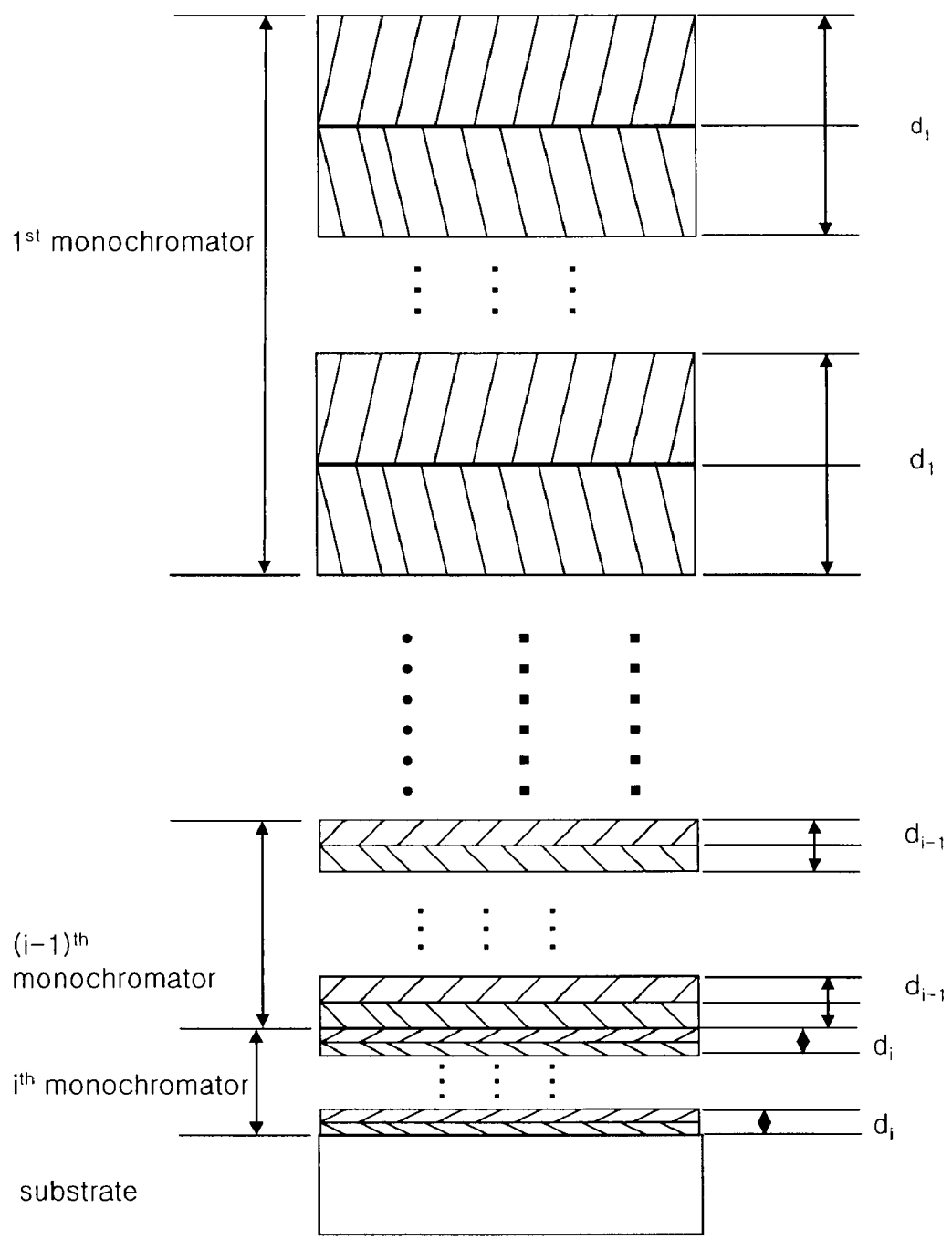
FIG. 8 schematically shows a supermirror fabricated according to the inventive method for fabricating a neutron supermirror using neutron monochromator structures.
Figure 9:
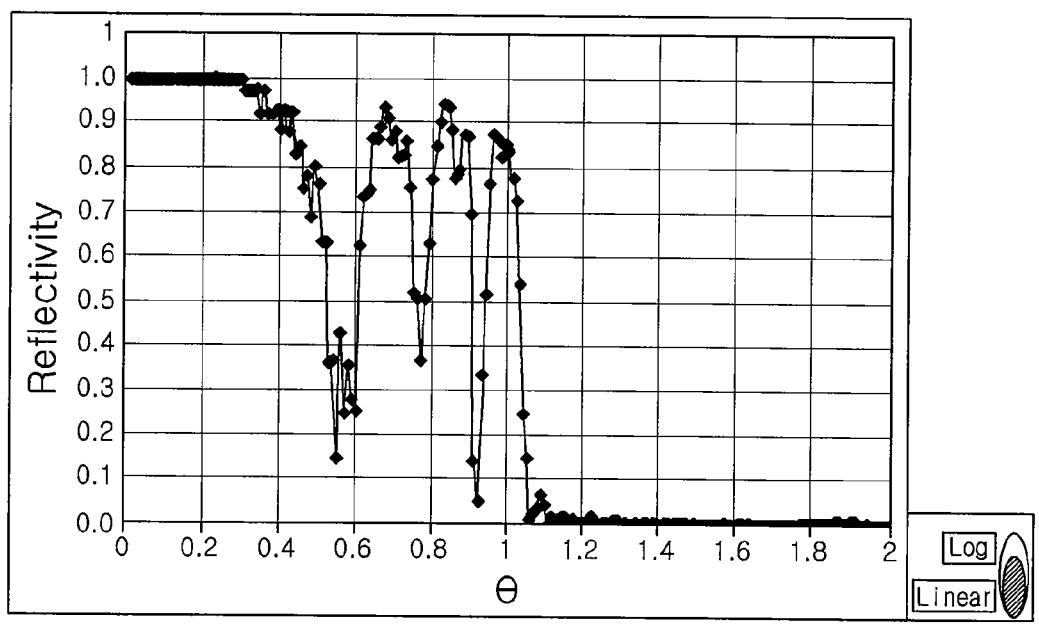
FIG. 9 is graphic diagram schematically showing reflectivity according to one embodiment of a supermirror fabricated according to the inventive method for fabricating a neutron supermirror using neutron monochromator structures.
Figure 10:
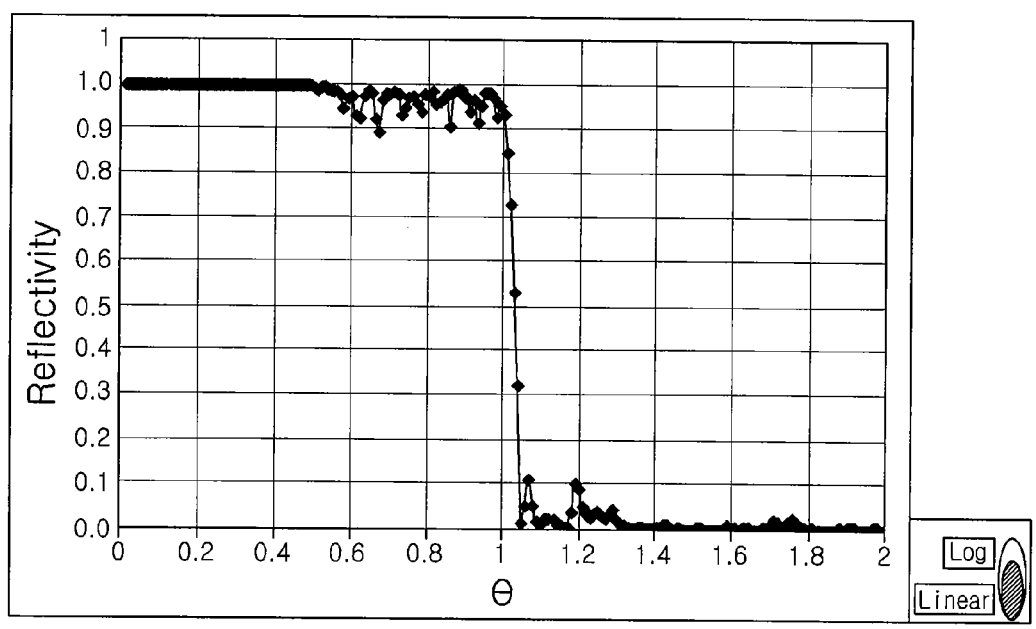
FIG. 10 is a graphic diagram schematically showing reflectivity according to another embodiment of a supermirror fabricated according to the inventive method for fabricating a neutron supermirror using neutron monochromator structures.
Figure 11:
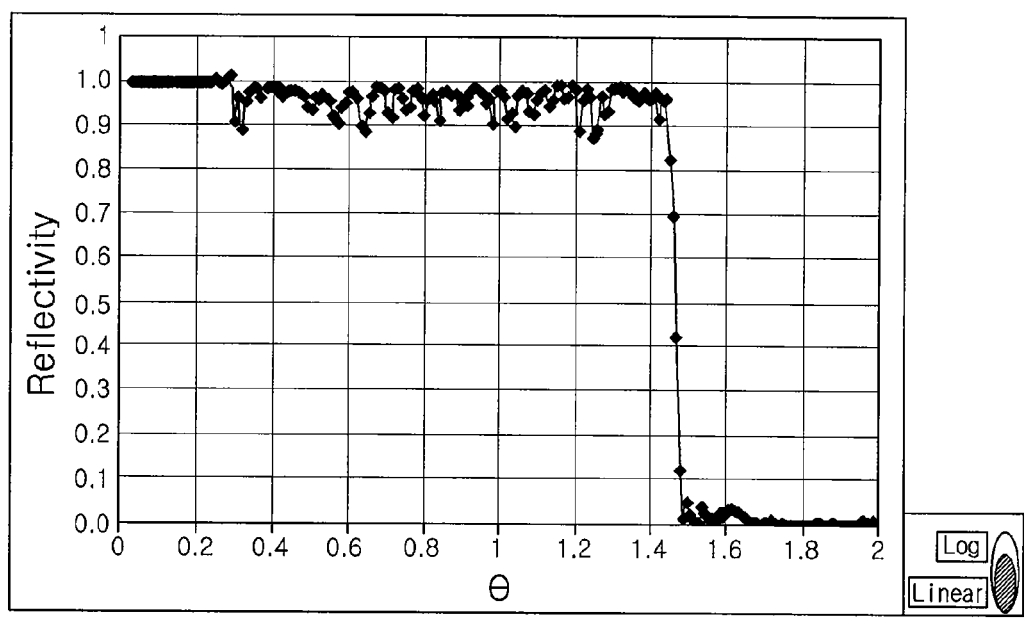
FIG. 11 is a graphic diagram schematically showing reflectivity according to still another embodiment of a supermirror fabricated according to the inventive method for fabricating a neutron supermirror using neutron monochromator structures.
Figure 12:
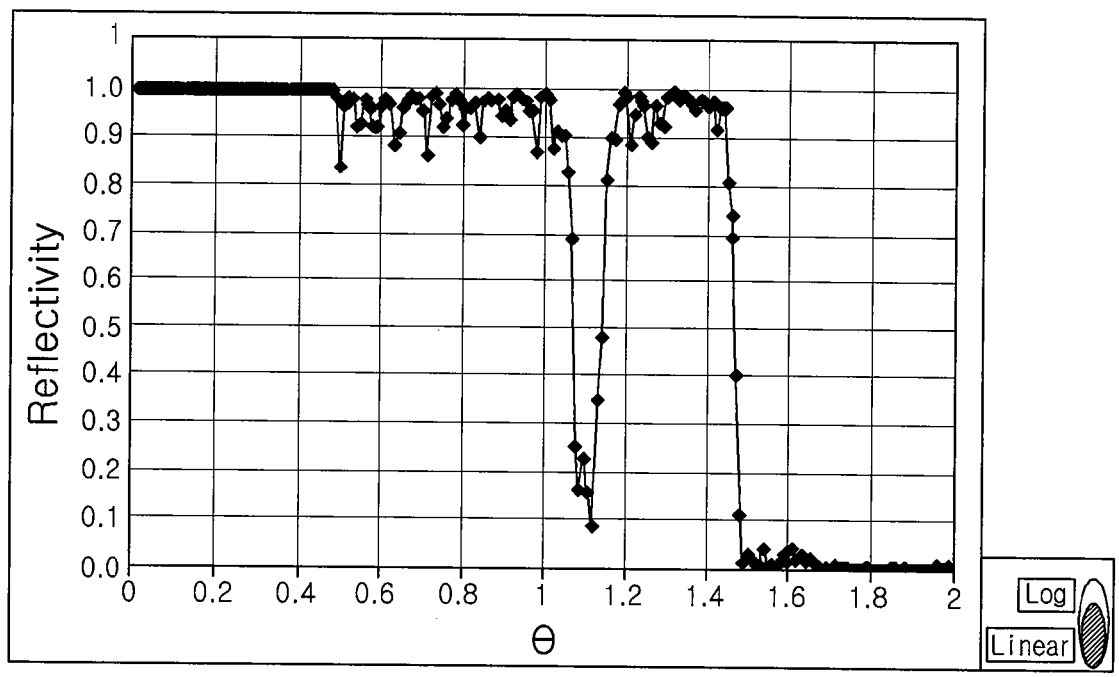
FIG. 12 is a graphic diagram schematically showing the reflectivity of a monochromatic beam filter to which is applied a supermirror fabricated according to the inventive method for fabricating a neutron supermirror using neutron monochromator structures.

FIG. 8 schematically shows a supermirror fabricated according to the inventive method for fabricating a neutron supermirror using neutron monochromator structures; FIG. 9 is graphic diagram schematically showing reflectivity according to one embodiment of a supermirror fabricated according to the inventive method for fabricating a neutron supermirror using neutron monochromator structures; FIG. 10 is a graphic diagram schematically showing reflectivity according to another embodiment of a supermirror fabricated according to the inventive method for fabricating a neutron supermirror using neutron monochromator structures; FIG. 11 is a graphic diagram schematically showing reflectivity according to still another embodiment of a supermirror fabricated according to the inventive method for fabricating a neutron supermirror using neutron monochromator structures; and FIG. 12 is a graphic diagram schematically showing the reflectivity of a monochromatic beam filter to which is applied a supermirror fabricated according to the inventive method for fabricating a neutron supermirror using neutron monochromator structures.

As shown in the figures, a method for fabricating a neutron supermirror using neutron monochromator structures according to the present invention comprises: forming a plurality of double layer structures of nickel thin films and titanium thin films, having varying thickness, in such a manner that a predetermined number of nickel thin films and titanium thin films, having the same thickness, are alternately stacked to form monochromators in each of which the nickel thin films and the titanium thin films are stacked in the form of periodic structures; and stacking the monochromators, having different thicknesses, on each other.

As described above, the nickel thin films and the titanium thin films, having the same thickness, are alternately stacked on each other in the form of periodic structures to form a plurality of monochromators having varying thicknesses, and then the monochromators having different thicknesses are stacked on each other to fabricate the supermirror.

Herein, the periodic structures of nickel thin films and titanium thin films, which form each of the monochromators, are preferably 4-5 in number. Also, the monochromators, each consisting of the periodic structures of nickel thin films and titanium thin films, having the same thickness, are preferably formed while the total thickness of each of the monochromators approaches the total reflection angle of nickel.

Specifically, the number of nickel thin films and titanium thin films in each of the monochromators, which are in the form of periodic structures, but have different total thicknesses, is adjusted such that reflectivity is made to approach the total reflection angle of nickel.

As described above, the monochromators, having different total thicknesses, are stacked on each other in the form of periodic structures to fabricate a supermirror in which peaks overlap each other. Thus, the reflectivity of neutrons in the supermirror can be increased by adjusting the number of periodic structures of monochromators.

For this purpose, the reflectivity of monochromators, which have the same thickness, but are in the form of periodic structures of nickel thin films and titanium thin films, is calculated using a periodic number-calculating equation and an equation for calculating full width at half maximum (FWHM), and the position of a peak to be located just next to the first peak is determined by the calculated periodic number and FWHM.

In the case of X-rays, n is smaller than 1 in all materials, and in the case of neutrons, n is smaller than 1 in most materials, except for several materials. Thus, the refractive index of X-rays is expressed by the following equations:

$$n = 1 - \delta + i\beta$$

$$\delta_x = \frac{r_0 \lambda^2}{2\pi} \rho_e$$

and $$\beta_x = \frac{\lambda}{4\pi} \mu_x,$$

wherein $\lambda$ represents wavelength, $r_o$ represents electron radius ($2.82 \times 10^{-13}$), $\rho_e$ represents $$\beta_n = \frac{\mu_n \lambda}{4\pi}$$

atomic density, and $\mu_n$ represents linear absorption coefficient.

Meanwhile, the refractive index of neutrons is expressed by the following equations:

$$n = 1 - \delta + i\beta,$$

$$\delta_n = \frac{\lambda^2}{2\pi} b \rho_n$$

and $$\beta_n = \frac{\mu_n \lambda}{4\pi},$$

wherein $\lambda$ represents wavelength, $b\rho_n$ represents scattering length density, and $\mu_n$ represents linear absorbance coefficient.

A periodic number-calculating equation, which provides the desired reflectivity for the periodic layers of the monochromators having the periodic structures of nickel (Ni) thin films and titanium (Ti) thin films, is as follows.

First, the maximum reflectivity of the monochromator, having a thin film structure, can be expressed by the following equation:

$$R_{m(max)} = (2Nd^2|F_m|/m)^2$$

wherein $R_{m(max)}$ represents the maximum reflectivity of the monochromator, N represents the periodic number of the thin films, m represents order, and structure factor $F_m$ is expressed by the following equation:

$$|F_m|^2 = \left[(f_a - f_b)\frac{\sin(ms\pi)}{(m\pi)}\right]^2$$

wherein $f_a$ represents $b_A \rho_A$, $f_b$ represents $b_B \rho_B$, and s represents the fractional thickness of layer A.

Meanwhile, if two thin films have the same thickness and m is an odd number, $F_m$ is as follows:

$$|F_m| = [(f_a - f_b)/m\pi]^2; \ m = \pm 1, \pm 3 \ldots$$

Also, if the interface diffusion is considered, $F_m$ is as follows:

$$|F_m|^2 = \begin{cases} |(f_A + f_B)/2|^2, & m = 0 \\ |(f_A - f_B)/4|^2, & m = \pm 1, \\ 0, & m = \pm 2, \pm 3, \ldots \end{cases}$$

When two thin films have the same thickness, m is an odd number, and the reflection of a first peak is considered, the maximum reflectivity of the monochromator is expressed as the following equation:

$$R_{m(max)} = 4N_i^2 d^4 |F_m|^2$$

If refractivity (R) is substituted with reflectivity saturation ($R_s$), it is as follows:

$$1 - R_s = \exp(-R_m)$$
$$\ln(1 - R_s) = -R_m$$
$$\ln(1 - R_s) = -4N_i^2 d^4 |F_m|^2$$
$$N_i^2 = \frac{-\ln(1 - R_s)}{4d^2 |F_m|^2}.$$

As described above, the periodic number of thin films, which provides the desired reflectivity, can be determined using monochromators consisting of nickel thin films and titanium films.

Meanwhile, if two thin films have the same thickness and m is an even number, structural factor $F_m$ is as follows: $|F_m|=0$.

Said $R_s$ (reflectivity saturation) can be variably applied. Specifically, the reflectivity saturation can be applied as variable values, for example, 0.9, 0.99 and 0.999, to determine the periodic number of thin films, which provides the desired reflectivity.

Meanwhile, an equation for calculating full width at half maximum, which provides the desired reflectivity for the periodic layers of nickel (Ni) and titanium (Ti), is as follows:

The position $\theta_i$ of the $1^{st}$ order Bragg Peak of any monochromator is as follows, if absorbance $\beta$ is disregarded:

$$\theta_i \approx \sqrt{\left(\frac{\lambda}{2d_i}\right)^2 + 2\delta}$$

wherein the full width at half maximum (FWHM) of the $1^{st}$ order Bragg Peak is as follows:

$$\Delta\lambda \approx \lambda/N_i,$$
$$\frac{\Delta\lambda}{\lambda} = \cot\theta_i \cdot \Delta\theta_i + \frac{\Delta d}{d_i},$$

wherein θ represents incident angle, and Δd represents thickness error, and $\Delta\theta_i$ is as follows:

$$\left(\frac{1}{N_i} - \frac{\Delta d}{d_i}\right) / \cot\theta_i = \Delta\theta_i.$$

The position of the Bragg Peak to be located just next to the first Bragg Peak is $$\theta_{i-1} = \theta_i - 2 \cdot \Delta\theta,$$

and thus the thickness corresponding to the position of the Bragg Peak is expressed as follows:

$$d_{i-1} \approx \frac{\lambda}{2\sqrt{\sin^2\theta_{i-1} - 2\delta}}.$$

When the position of $d_1$ is approached near the total reflection angle of a nickel mirror by continuously iterating the calculation of FWHM as described above, a supermirror will be completed.

According to this method, a supermirror is completed by variably applying parameters, such as Δd (thickness error) and the overlap amount Δθ×T (T=max 1–0) between Bragg Peaks, to approach the total reflection angle of a nickel mirror.

The reflectivity of the supermirror thin film, fabricated using the periodic number-calculating method and the FWHM calculation method in the method for fabricating the neutron supermirror using the neutron monochromator structures, is shown in FIG. 9. As shown in FIG. 9, when a supermirror having the following parameters is fabricated, a peak is located such that reflectivity according to incident angle in the supermirror approaches a total reflection angle of 0.5° according to the periodic number and FWHM of the monochromator: the reflectivity saturation ($R_s$) of the supermirror=0.99; Δd=0; T=1; wavelength=0.475 nm; periodic number=30; and m=2.

Also, when each of the supermirrors having the following parameters is fabricated, a peak is located such that reflectivity according to incident angle in the supermirror approaches the total reflection angle of 0.5° by the periodic number and FWHM of the monochromator, as shown in FIGS. 11 and 12: the reflectivity saturation of the supermirror ($R_s$)=0.999, Δd=1.5; T=0.7; wavelength=0.475 nm; periodic number=61; and m=2 or m=3.

In other words, the supermirror is fabricated by stacking a plurality of monochromators, having periodic structures of nickel thin films and titanium thin films, on each other. The reflectivity of neutrons in this supermirror is improved, as shown in FIGS. 10 and 11, by adjusting the thickness of the monochromators so as to reflect all incident wavelengths due to the overlap of peaks caused by the monochromators having different thickness, and adjusting the amount of the peak overlap.

The supermirror fabricated by the inventive method for fabricating the neutron supermirror using neutron monochromator structures can be manufactured into a filter for extracting a specific wavelength.

Specifically, among the monochromators stacked in the form of periodic structures, a monochromator reflecting a specific wavelength can be replaced with a transmission monochromator instead of a reflection monochromator, to obtain only a specific wavelength.

Also, among the plurality of monochromators having the periodic structures of nickel thin films and titanium thin films, a monochromator reflecting a specific wavelength may be removed to obtain the specific wavelength.

When only the specific wavelength is obtained, as described above, an increase in dispersion can be suppressed and it will be easy to adjust the wavelength width (Δλ) of a monochromatic beam.

As described above, to fabricate a monochromatic beam filter using a supermirror having the following parameters, a reflection monochromator reflecting a specific wavelength, among monochromators forming the supermirror, can be replaced with a transmission monochromator such that the monochromatic beam filter can transmit only the specific wavelength, as shown in FIG. 12: the reflectivity saturation ($R_s$) of the supermirror=0.999; $\Delta d$=1.5; T=0.7; wavelength=0.475 nm; periodic number=61; and m=3.

In order words, among monochromators reflecting the respective wavelengths in the supermirrors consisting of the plurality of monochromators, a given monochromator reflecting a specific wavelength can be replaced with a transmission monochromator, such that only the specific wavelength is transmitted through the transmission monochromator, and the remaining wavelengths are reflected.

According to another embodiment of the present invention, a supermirror can also be fabricated by stacking double-film structures of nickel thin films and titanium thin films on each other in the form of periodic structures, in which a predetermined number of the double-film structures having the same thickness are stacked on each other. In this case, it is preferable to adjust the number of double-layer structures of nickel thin films and titanium thin films such that the reflectivity of neutrons in the supermirror can be controlled.

As described above, according to the present invention, the neutron supermirror, which is widely used in the formation of thin films in cold neutron guides and the spectrometer field, is fabricated with nickel thin films and titanium thin films by stacking nickel thin films and titanium thin films, having the same thickness, on each other, to form monochromator structures in which the nickel thin films and the titanium thin films are alternately stacked in the form of periodic structures, and then stacking the monochromator structures having different thickness on each other. Thus, the overlap of peaks by the monochromators is possible, the amount of the overlap can be adjusted to increase reflectivity, and some of the monochromators can be removed during the fabrication of the supermirror to make it easy to extract a monochromatic beam. In addition, it is easy to fabricate a transmission monochromator, but not a reflection monochromator, making it possible to fabricate a filter for extracting a specific wavelength.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for fabricating a supermirror for forming a neutron guide having neutrons therein, the method comprising:

1) forming a plurality of monochromators comprising the steps of:
   a) forming a plurality of bilayers of different thickness wherein each bilayer comprises a Ni thin layer and a Ti thin layer wherein the Ni thin layer of each bilayer has a thickness which is equal to the Ti thin layer thickness of that bilayer; and
   b) alternately stacking a plurality of said bilayers having the same thickness to form the plurality of monochromators of different thickness;

2) stacking at least some of the plurality of monochromators of different thickness on each other for forming a supermirror.

2. The method of claim 1, wherein the number of the nickel thin films and titanium thin films stacked in each monochromator is adjusted so as to control reflectivity.

3. The method of claim 1, wherein the reflectivity of each of the monochromators is calculated according to a periodic number-calculating equation and an equation for calculating full width at half maximum (FWHM), and the positions of peaks are determined by the calculated periodic number and FWHM.

4. The method of claim 1, wherein, among the plurality of monochromators, a monochromator reflecting a specific wavelength is removed to extract the specific wavelength.

* * * * *